United States Patent
Begon et al.

(10) Patent No.: US 7,572,006 B2
(45) Date of Patent: Aug. 11, 2009

(54) TRANSPARENT AND POLARIZING VISION ELEMENT HAVING AREAS WHICH ARE ASSOCIATED WITH POLARIZATION FILTERS THAT ARE RESPECTIVELY VERTICALLY AND HORIZONTALLY ORIENTED

(75) Inventors: Cédric Begon, Charenton-le-Pont (FR); John Biteau, Charenton-le-Pont (FR); Claudine Biver, Charenton-le-Pont (FR); Richard Bosmans, Charenton-le-Pont (FR); Jean-Paul Cano, Charenton-le-Pont (FR); Guillaume Giraudet, Charenton-le-Pont (FR); Richard Muisener, St-Petersburg, FL (US)

(73) Assignee: Essiler International (compagnie Generale D'optique), Charenton, Cedex (FR)

( * ) Notice: Subject to any disclaimer, the term of this patent is extended or adjusted under 35 U.S.C. 154(b) by 292 days.

(21) Appl. No.: 10/594,937

(22) PCT Filed: Mar. 29, 2005

(86) PCT No.: PCT/FR2005/000749

§ 371 (c)(1),
(2), (4) Date: Sep. 28, 2006

(87) PCT Pub. No.: WO2005/098520

PCT Pub. Date: Oct. 20, 2005

(65) Prior Publication Data

US 2007/0177099 A1    Aug. 2, 2007

(30) Foreign Application Priority Data

Apr. 2, 2004    (FR)    .................... 04 03509

(51) Int. Cl.
*G02C 7/10* (2006.01)
(52) U.S. Cl. ............................ 351/163; 351/49; 351/44
(58) Field of Classification Search ................ 351/163, 351/49

See application file for complete search history.

(56) References Cited

U.S. PATENT DOCUMENTS 2,334,446 A    11/1943    Serrell
3,211,047 A    10/1965    Heimberger (Continued)

FOREIGN PATENT DOCUMENTS

DE    10237684    3/2004

(Continued)

OTHER PUBLICATIONS

Machine Translation of DE 10237684, Mar. 4, 2004.*

(Continued)

*Primary Examiner*—Jessica T Stultz
(74) *Attorney, Agent, or Firm*—Occhiuti Rohlicek & Tsao LLP

(57) ABSTRACT

A transparent and polarizing vision element (2) divided into several areas. At least two of said areas are associated with a luminous polarization filter. The light flowing through the element is allocated differently for two the areas according to a direction of polarization of the light. At least one polarization filter is oriented vertically, and at least one polarization filter is oriented horizontally in relation to the usual position of the element.

8 Claims, 1 Drawing Sheet

U.S. PATENT DOCUMENTS

| | | | |
|---|---|---|---|
| 3,838,913 A * | 10/1974 | Schwarz | 351/47 |
| 5,142,411 A * | 8/1992 | Fiala | 359/494 |
| 6,250,759 B1 | 6/2001 | Kerns, Jr. et al. | |
| 2004/0046927 A1 | 3/2004 | Montgomery | |
| 2005/0099588 A1* | 5/2005 | Helpern et al. | 351/44 |
| 2007/0146574 A1* | 6/2007 | Giraudet | 349/86 |
| 2008/0252846 A1* | 10/2008 | Biver et al. | 351/163 |

FOREIGN PATENT DOCUMENTS

| | | |
|---|---|---|
| FR | 2736444 | 1/1997 |

OTHER PUBLICATIONS

International Search Report PCT/FR2005/000749.

* cited by examiner

TRANSPARENT AND POLARIZING VISION ELEMENT HAVING AREAS WHICH ARE ASSOCIATED WITH POLARIZATION FILTERS THAT ARE RESPECTIVELY VERTICALLY AND HORIZONTALLY ORIENTED

CROSS-REFERENCE TO RELATED APPLICATIONS

This application is the National Stage of International Application No. PCT/FR2005/000749, filed on Mar. 29, 2005, which claims the benefit of French Application Serial No. 0403509, filed on Apr. 2, 2004. The contents of both of the foregoing applications are hereby incorporated by reference in their entirety.

FIELD OF THE INVENTION

The present invention relates to a transparent and polarizing vision element having at, least one zone associated with a vertically oriented polarization filter and at least one zone associated with a nonvertically oriented polarization filter.

BACKGROUND OF THE INVENTION

U.S. Pat. No. 6,250,759 describes spectacle lenses suitable for the practice of leisure activities, such as golf, hunting or fishing. Such lenses are divided into several zones whose characteristics of light transmission are adapted according to the objects or the landscape viewed during the practice of these activities. In particular, distinct zones of the lens may have different characteristics of filtering the light according to a polarization of the latter.

Natural light is not polarized; the electromagnetic waves of which it consists vibrate in all directions. David Brewster (from 1811) showed that, for a certain incidence, a monochromatic light reflected onto a transparent surface is polarized 100%. Brewster's Law stipulates that the direction of polarization of the reflected wave is parallel to the plane of reflection. This is why the reverberation of light on a horizontal plane will be polarized horizontally. Polarizing ophthalmic lenses were designed in response to these physical properties of reflected light. A lens whose direction of polarization is horizontal selectively filters the light rays originating from the reflection on horizontal transparent surfaces. These lenses are particularly effective for eliminating the annoying reverberations on surfaces of water, on ground coverings, on sand or snow. Nevertheless, the horizontal reflecting surfaces do not form the majority of the potential sources of dazzling. This is why the light reflecting on the panes of a building or a motor vehicle will, in the converse to the case previously described, be polarized vertically. The polarizing lenses currently available on the market are therefore totally ineffective for protecting the observer against these light attacks.

Certain features of the landscape present in the field of vision of a person are particular to the urban environment. The urban environment in particular has many vertical reflecting surfaces, such as, for example, building windows. These vertical walls generate reflections whose intensity can be sufficient to cause dazzling. Such dazzling is a source of discomfort, but it may also be a source of danger in certain circumstances. This is the case for a motor vehicle or motorcycle driver, for example.

SUMMARY OF THE INVENTION

One object of the present invention is to provide protection of the visual function against dazzling associated with the reverberations of light on reflecting surfaces, thanks in particular to a limitation of the discomfort associated with the various dazzling sources of reverberations.

For this, the present invention proposes a transparent and polarizing vision element divided into several zones. At least two of the zones are associated with a light polarization filter. The light traversing the element is affected differently for two of said zones according to a direction of polarization of said light. The polarization filter of at least one of the zones is oriented vertically relative to the position of use of the element and the polarization filter of at least one of said zones is oriented horizontally relative to the position of use of said element.

"Transparent and polarizing vision element" (also called element) means lenses and ocular visors. "Lenses" means all lenses made of mineral or organic material, of composites and in variable forms suitable for a spectacle frame to protect and/or correct the sight, these lenses being chosen from a focal, unifocal, bifocal, trifocal and varifocal lenses. "Ocular visors" means any composite organic material and in variable forms suitable for a protector that allows vision: as an illustrative and nonlimiting example, it is possible to cite the ocular visor of a mask (for diving, mountain activities, sport, etc.), the ocular visor of a helmet (of a vehicle driver, of protection for speed sports, etc.).

"Position of use of the transparent and polarizing vision element" means the position of this element when it is adapted in a frame in front of the eyes of a person according to the normal use of the element, for a vertical position of the head of the person. "Vertical" refers to the gravitational vertical. Conversely, "horizontal" refers to a direction deviating by an angle of 90° relative to the gravitational vertical.

The optical center of a lens, considered in the following, is often confused with the geometric center of the lens before grinding. More generally, the optical center may be defined in one of the following ways:

the point situated on the lens in the middle of two etchings;
the point representing the prism prescribed for the wearer in long vision;
the point materialized on the lens, before mounting in the frame, by a cross traced on the lens;
or the point through which the optical axis of the lens passes, the optical axis representing the line joining the centers of the two surfaces composing the lens.

"Orientation of a polarization filter" means the orientation of the electric field of an incident light for which the intensity of the light transmitted through this filter is minimal or zero. In the context of the invention, consideration is given only to linear polarizations of light, or linear components of light polarization. Natural light is not polarized. It has no particular directions. On the other hand, a light reflected on a transparent surface is polarized. The direction of polarization of the reflected wave is parallel to the plane of reflection. Thanks to the presence of a vertically oriented polarization filter in at least one zone of the element, the light originating from reflections on vertical walls is attenuated by the observer looking through said zone. An improved visual comfort results therefrom in an urban environment.

According to a preferred embodiment of the invention, the zone associated with the vertically oriented polarization filter is situated in a lateral portion of the element relative to its position of use. The transparent vision element is then particularly suited to the usual dazzling situation in an urban environment, whereby the reflection on a vertical wall is situated in a lateral portion of the field of vision. Such a situation corresponds to the case of a pedestrian or a driver looking in the direction of a street bordered by store windows causing reflections. It also corresponds to the case of a driver of a motor vehicle being dazzled due to the reflection of light on vehicles present on his right and/or on his left. In particular, the zone associated with the vertically oriented polarization filter may be adjacent to a lateral edge of the element.

In the context of the invention, at least one of the zones of the element, other than that associated with a vertically oriented polarization filter, is associated with a polarization filter oriented in a horizontal direction. According to a variant of the invention, the transparent and polarizing vision element may also comprise at least one unpolarized zone.

Therefore, in the case of an element having two zones, the first zone ($2a$) is associated with a vertically oriented polarization filter and the second zone ($2b$) is associated with a polarization filter oriented horizontally relative to the position of use of the element (FIG. 1).

Advantageously, the first zone associated with a polarization filter oriented vertically relative to the position of use of the element is adjacent to the outer lateral edge of the optical element. In the case where the optical element is a lens as previously defined, said first zone extends over a width going from the outer lateral edge of said lens to a distance lying between 5 and 75 mm (preferably between 5 and 30 mm), measured on a straight line going from said outer lateral edge toward the optical center as previously defined of said lens.

In a second embodiment of the invention, the transparent and polarizing vision element may comprise more than two zones. It may in particular comprise first and second zones, each associated with a polarization filter oriented vertically relative to the position of use of said element and at least a third zone situated between said first and second zones and suitable for affecting the light traversing said third zone in a manner different from said first and second zones according to the direction of polarization of said light.

Such a transparent and polarizing vision element provides identical protection against dazzling caused by reflections originating from each side of the field of vision. The third zone of the element, situated between the two zones associated with the vertically oriented filters, then corresponds to a central portion of the field of vision used in looking straight ahead, without turning the head. This portion of the field of vision is then not affected by the vertically oriented filters. This third zone ($2b$) of the element is then associated with a horizontally oriented polarization filter (FIG. 2). This central zone then makes it possible to attenuate the dazzling sources originating from the reflection of light on horizontal surfaces such as surfaces of water or wet roads. Such a vision element is then particularly suitable for driving comfort.

Said first and second zones ($2a$) associated with a vertically oriented polarization filter are preferably positioned adjacent to a lateral edge of the element; they are separated by a distance lying between 10 and 60 mm, preferably by a distance lying between 10 and 40 mm, and very preferably by a distance lying between 20 and 40 mm, in a central portion of said element when said transparent and polarizing vision element represents a lens as defined hereinabove.

According to another variant of the invention (FIG. 3), the transparent and polarizing vision element may comprise:
a first zone ($2a$) associated with a polarization filter oriented vertically relative to the position of use of the element (said first zone preferably being positioned adjacent to the outer lateral edge of said element),
a second zone ($2b$) associated with a horizontally oriented polarization filter;
and a third, unpolarized zone ($2c$).

In the context of this variant embodiment of the invention, said second zone is preferably positioned in the top portion of the optical element relative to the position of use of said element. In this manner, said third zone is preferably positioned in the bottom portion of the optical element relative to the position of use of said element.

The transparent and polarizing vision element may comprise, in another embodiment, a fourth zone (FIG. 4) situated: between the first and second zones ($2a$) associated with a polarization filter oriented vertically relative to the position of use of said element, each of said zones being positioned adjacent to a lateral edge of said element;
and beneath a third zone ($2b$) in the position of use of the element, said third zone being associated with a polarization filter oriented horizontally relative to the position of use of the element;
and said fourth zone ($2c$) is associated with no polarization filter. The third zone then provides protection against dazzling by reflections on horizontal surfaces.

The invention also relates to a vision device incorporating at least one transparent vision element as previously described.

The vision device may comprise a pair of spectacles. The transparent vision element then forms a lens of said pair of spectacles.

The vision device may also comprise a helmet, for example a motorcycle helmet. A visor of the helmet then consists of the transparent and polarizing vision element.

The device may also be a visor of a mask, with two separate lenses or with a single lens, irrespective of the function of the mask. It may be a mountain activities mask, a diving mask, a sports mask, a mask suitable for driving convertible vehicles, etc.

It will be clearly understood by those skilled in the art that, in the case of a visor, it will be sufficient, for obtaining measurements relative to the position and to the width of the zones of the element, to take account of the distance between the pupils of the wearer.

BRIEF DESCRIPTION OF THE DRAWINGS

Other particular features and advantages of the present invention will appear in the following description of several exemplary, nonlimiting embodiments of an exemplary vision device incorporating an embodiment of the invention, with reference to the appended drawings, in which.

DETAILED DESCRIPTION OF THE PREFERRED EMBODIMENTS

Figure 1:
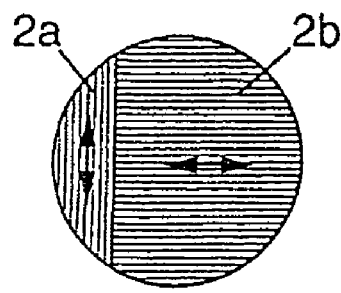
FIG. 1 (FIG. 1) represents a transparent and polarizing vision element comprising a first zone ($2a$) associated with a polarization filter oriented vertically relative to the position of use of the element and situated adjacent to the lateral edge of said vision element; and a second zone ($2b$) associated with a polarization filter oriented horizontally relative to the position of use of the element.
Figure 2:
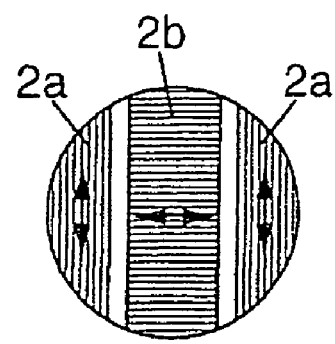
FIG. 2 (FIG. 2) represents a transparent and polarizing vision element comprising two lateral zones ($2a$) associated with a polarization filter oriented vertically relative to the position of use of the element; and a third zone ($2b$) associated with a polarization filter oriented horizontally relative to the position of use of the element; such a vision element is particularly suitable for example for a wearer in a situation of driving a vehicle in an urban situation.
Figure 3:
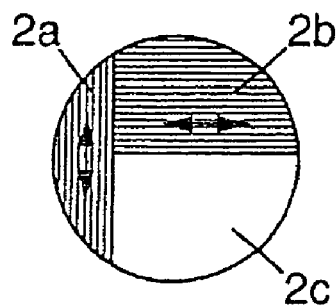
FIG. 3 (FIG. 3) represents a transparent and polarizing vision element comprising a first zone ($2a$) associated with a polarization filter oriented vertically relative to the position of use of the element and positioned adjacent to the outer lateral edge of said element, a second zone ($2b$) associated with a horizontally oriented polarization filter and situated in the upper portion of said element; and a third, unpolarized zone ($2c$) situated in the lower portion of said element.
Figure 4:
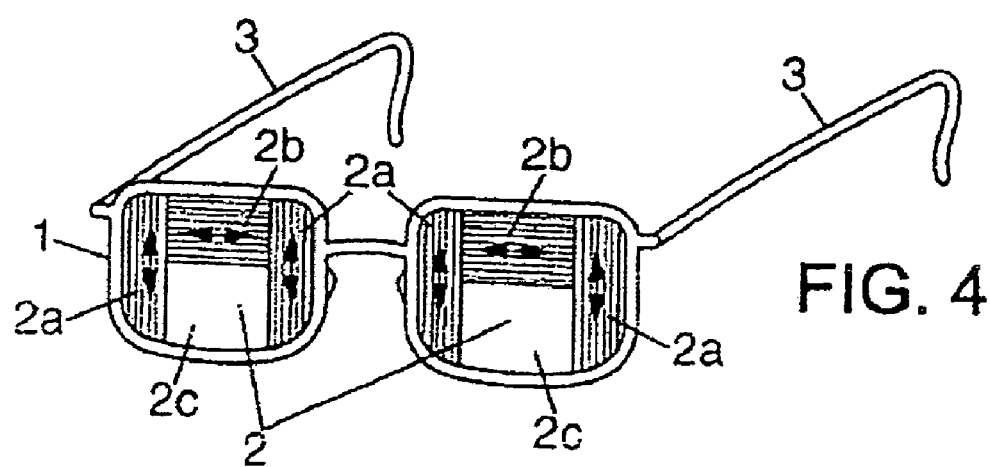
FIG. 4 (FIG. 4) represents a pair of spectacles fitted with lenses according to a fourth embodiment of the invention.

With reference to FIG. 4, a pair of spectacles comprises a frame 1 with two arms 3, fitted with two lenses 2. The word "lens" is taken as its usual meaning of a transparent optical element for a pair of spectacles, unrelated to the nature of the material constituting the latter. A spectacle lens as considered in the context of the invention may therefore be made of organic material, such as polycarbonate, polyurethane, etc. or of mineral material, for example silicate-based.

In the context of the invention, a spectacle lens may be only a support for the polarization filter. In this case, the two faces of the lens are parallel, so as not to introduce any image distortion. It may also be a lens having an ophthalmic corrective activity, irrespective of the nature of the correction (correction of near-sightedness, of astigmatism, of hyperopia and of presbyopia) and it may be an a focal, unifocal, bifocal, trifocal or varifocal lens in particular. The lens may also be associated with other optical functions, such as a sun protection lens or a photochromic lens etc.

In FIG. 4, the lens 2 is divided into four distinct zones. Two zones, with reference number 2a, associated with a vertically oriented polarization filter, are situated laterally, that is to say close to the left and right edges of the lens 2 respectively. Each of the zones 2a has a substantially rectilinear and vertical limit on the side of the center of the lens 2. C indicates the optical center of the lens 2. The distance d between the respective limits of the two zones 2a situated on the side of the center C, measured at the height of the center C, lies between 10 and 60 mm. It is preferably less than 40 mm. Because of the oculomotor strategies of the various categories of individuals, the inventors have found that a distance d lying between 20 and 40 mm is a satisfactory compromise.

The central portion of the lens situated between the two zones 2a may itself be divided into two zones 2b and 2c. The zone 2b is associated with a polarization filter oriented horizontally relative to the position of use of the pair of spectacles. The zone 2c is associated with no polarization filter. Thus, the reverberation of the light, on a horizontal reflecting surface is attenuated or suppressed when it passes through said zone 2b. Such a light may originate from a reflection on the surface of the ground situated in front of the wearer of the pair of spectacles. In particular, it may be a reflection on the surface of a wet road situated in front of a vehicle driver.

The vehicle driver wearing a pair of spectacles fitted with lenses according to FIG. 4 is therefore protected both from dazzling caused by reflections on vertical walls situated laterally in his field of vision, and from reflections on the surface of a road situated in front of him. In addition, the lower central portion of his field of vision, corresponding to the zone 2c, is affected by no polarization filter. Said zone 2c thus makes it possible not to limit the visibility of the liquid crystal displays which emit a polarized light and whose direction of polarization depends on the technology of the display system and on the mounting constraints and choice of the vehicle manufacturer.

The limit between the zones 2b and 2c may pass between the center C and a point situated 20 millimeters beneath the center C. Preferably, it is situated 10 millimeters beneath the center C. Such a position of the limit between the zones 2b and 2c of the lens 2 is particularly suitable for the locations of the various display systems present in a vehicle compartment.

Multiple variants may be introduced relative to the embodiments described hereinabove.

Amongst them, the zones of the transparent and polarizing vision element may be modified, by modifying the shape of the limits of each zone. In particular, these limits may be rectilinear of curvilinear.

Each polarization filter may be made according to one of the technologies known to those skilled in the art, not described here. It may be a filter by absorption of the vertically polarized light or, where necessary, a filter by reflection of the vertically polarized light.

The invention claimed is:

1. A transparent and polarizing vision element divided into several zones, at least two of said zones being associated with a light polarizing filter, the light traversing the element being affected differently for two of said zones according to a direction of polarization of said light,
   the element a spectacle lens and comprising:
   a first zone associated with a polarizing filter oriented vertically with respect to a use position of the element, said first zone being located in a lateral part of the element with respect to the use position;
   a second zone associated with a polarizing filter oriented horizontally, the element being characterized in that the second zone is located in the upper part of the element with respect to the use position; and
   a third zone that is not-polarizing and is located in the lower part of the element with respect to the use position,
   wherein
   the element comprises two first zones, each associated with a polarization filter oriented vertically relative to the position of use of the element and each located adjacent to a lateral edge of the element, and
   the second and third zones are located between said two first zones, said third zone being located below said second zone in the use position of the element, and
   said two first zones are separated by a distance lying between 10 and 60 mm in a central portion of said element.

2. The element as claimed in claim 1, in which the first zone associated with the vertically oriented polarization filter extends over a width going from the outer lateral edge of said element to a distance lying between 5 and 75 mm, measured on a straight line going from said outer lateral edge toward the optical center of said element.

3. The element as claimed in claim 2, in which the first zone associated with the vertically oriented polarization filter extends to a distance lying between 5 and 30 mm from the outer lateral edge of the element.

4. The element as claimed in claim 1, in which said two first zones are separated by a distance lying between 10 and 40 mm in a central portion of said element.

5. The element as claimed in claim 4, in which said two first zones are separated by a distance lying between 20 and 40 mm in a central portion of said element.

6. The element as claimed in claim 2, in which the limit, between the second zone associated with a horizontally oriented polarization filter and the third zone associated with no polarization filter, passes between the optical center of said element and a point situated 20 mm beneath said optical center.

7. The element as claimed in claim 6, in which the limit between the second and third zones passes between the optical center and a point situated 10 mm beneath said optical center.

8. A vision device comprising a pair of spectacles, said transparent vision element according to claim 1 constituting one lens of said pair of spectacles.

* * * * *

UNITED STATES PATENT AND TRADEMARK OFFICE
CERTIFICATE OF CORRECTION

| | |
|---|---|
| PATENT NO. | : 7,572,006 B2 |
| APPLICATION NO. | : 10/594937 |
| DATED | : August 11, 2009 |
| INVENTOR(S) | : Cedric Begon et al. |

It is certified that error appears in the above-identified patent and that said Letters Patent is hereby corrected as shown below:

Title Page
Please correct item (73) to read "Essilor International (compagnie Generale D'Optique)"

Signed and Sealed this

Sixteenth Day of February, 2010

David J. Kappos
*Director of the United States Patent and Trademark Office*